May 23, 1939.  M. R. DEWHURST  2,159,473
PRODUCTION OF MACHINE-SET TYPE COMPOSITION
Filed March 19, 1938  6 Sheets-Sheet 1
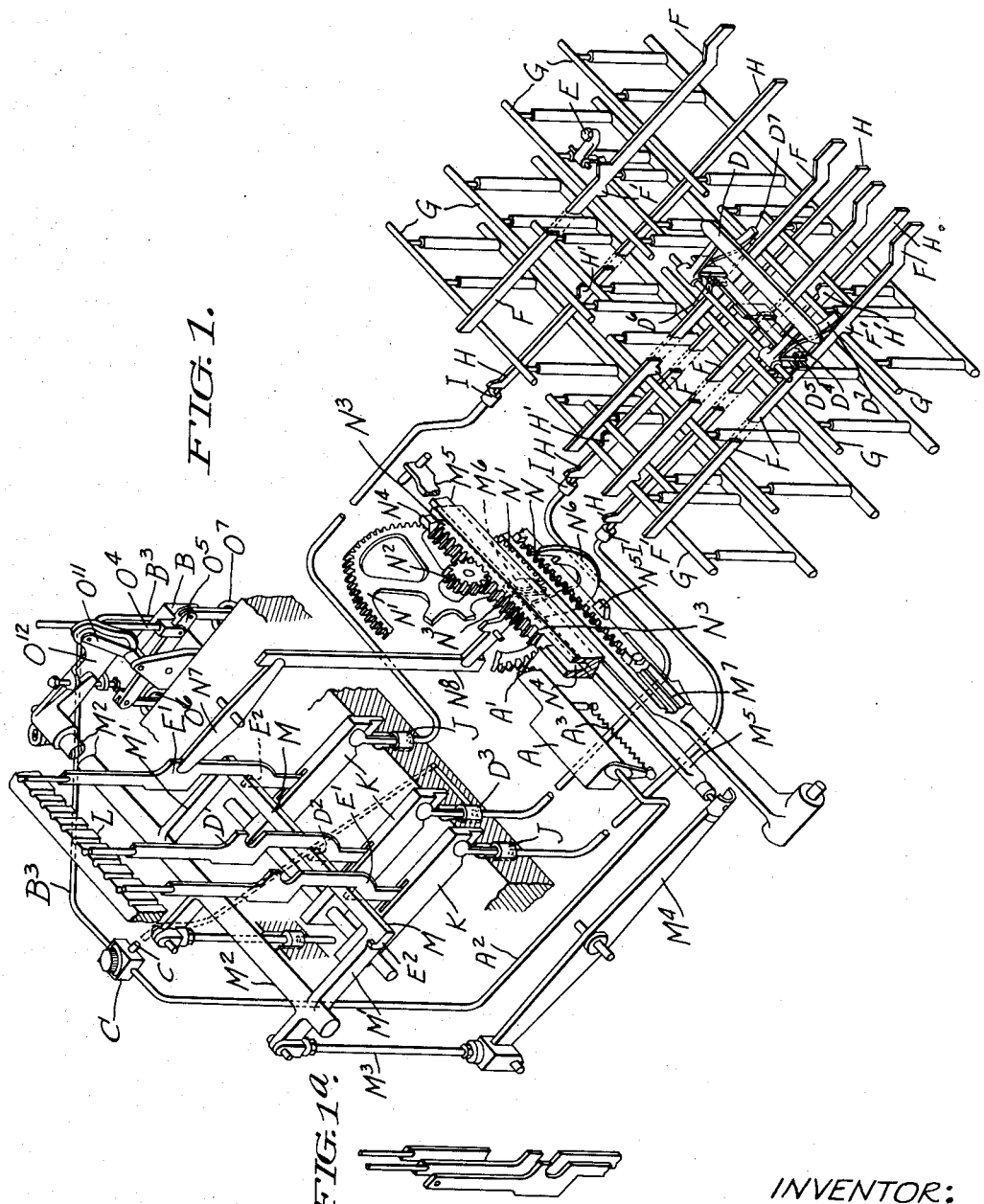
INVENTOR:
Maurice Richard Dewhurst,
BY John A. Ferguson
HIS ATTORNEY.

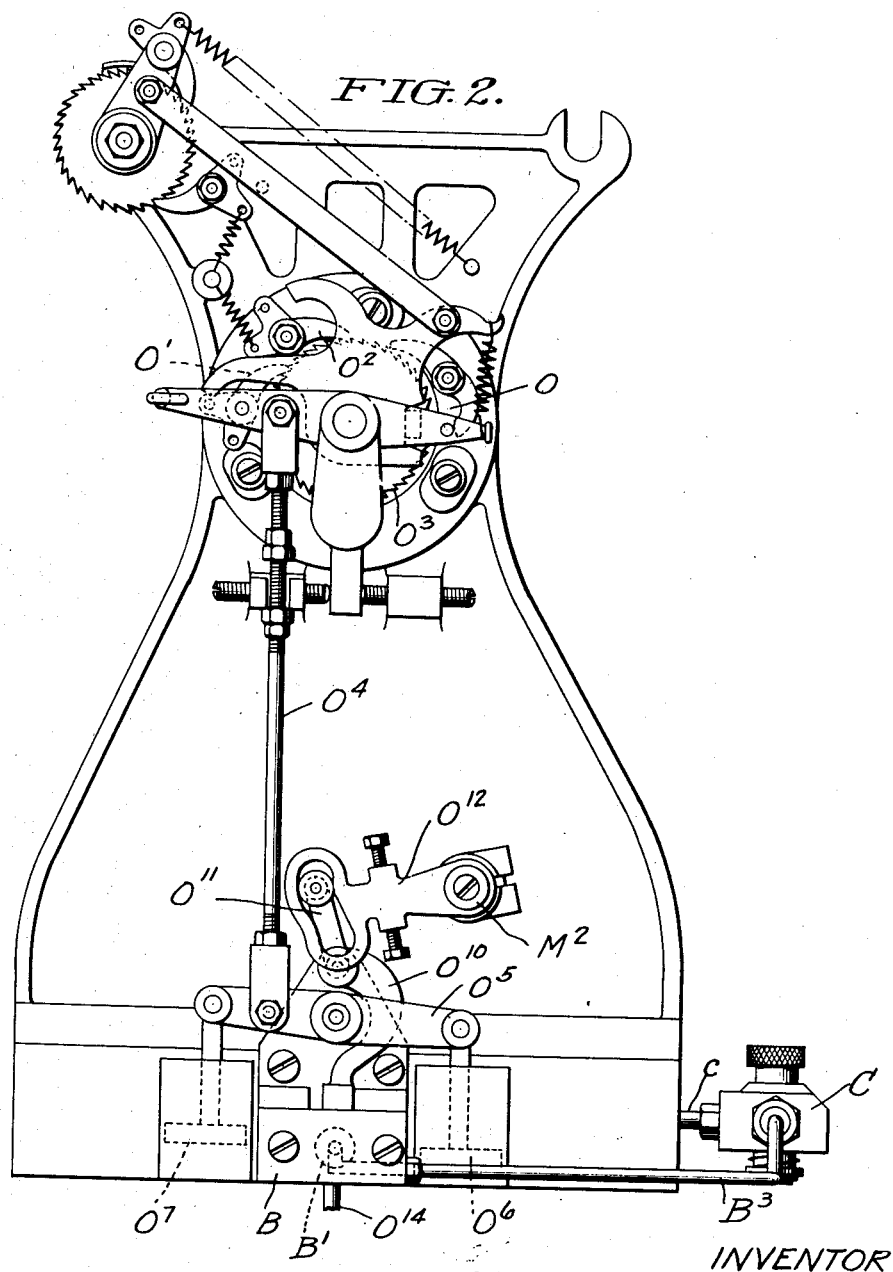

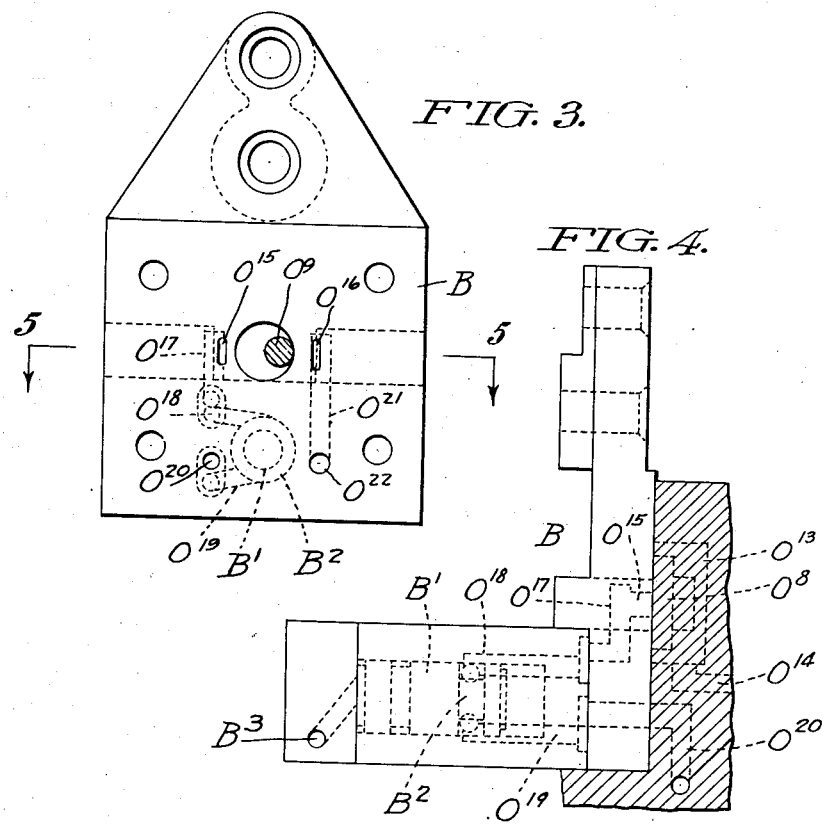
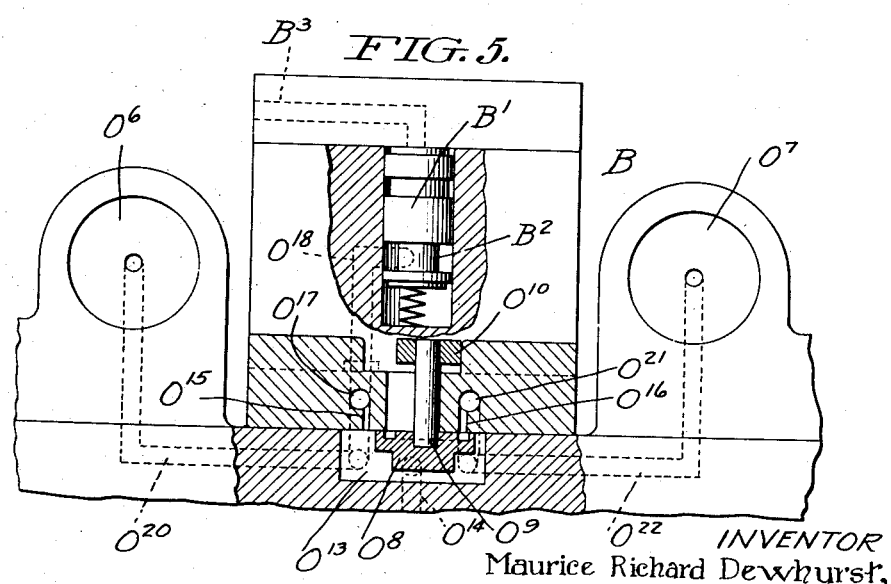

May 23, 1939.  M. R. DEWHURST  2,159,473
PRODUCTION OF MACHINE-SET TYPE COMPOSITION
Filed March 19, 1938   6 Sheets-Sheet 4
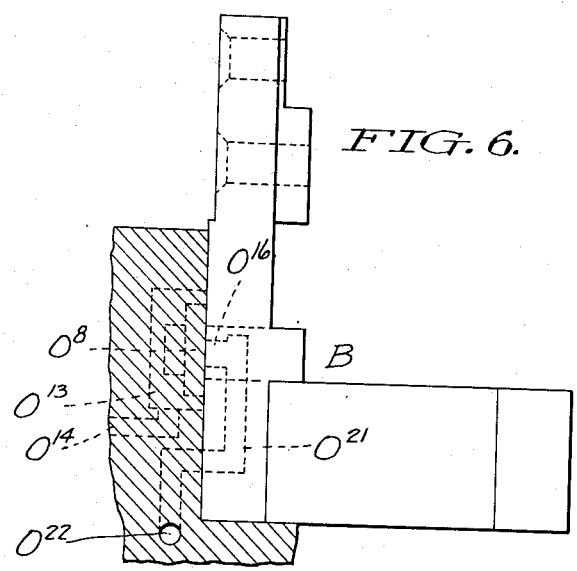
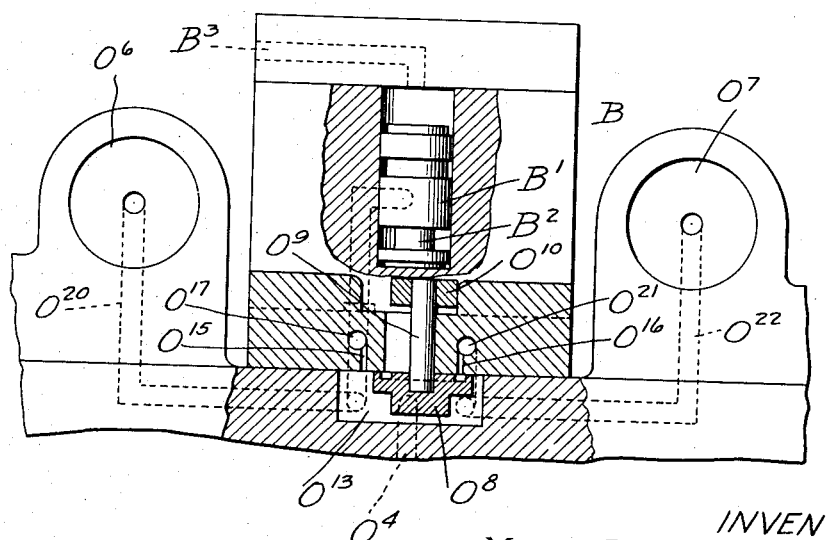
INVENTOR:
Maurice Richard Dewhurst,
BY
John A. Ferguson
HIS ATTORNEY.

May 23, 1939.                    M. R. DEWHURST                      2,159,473
                    PRODUCTION OF MACHINE-SET TYPE COMPOSITION
                      Filed March 19, 1938            6 Sheets-Sheet 5
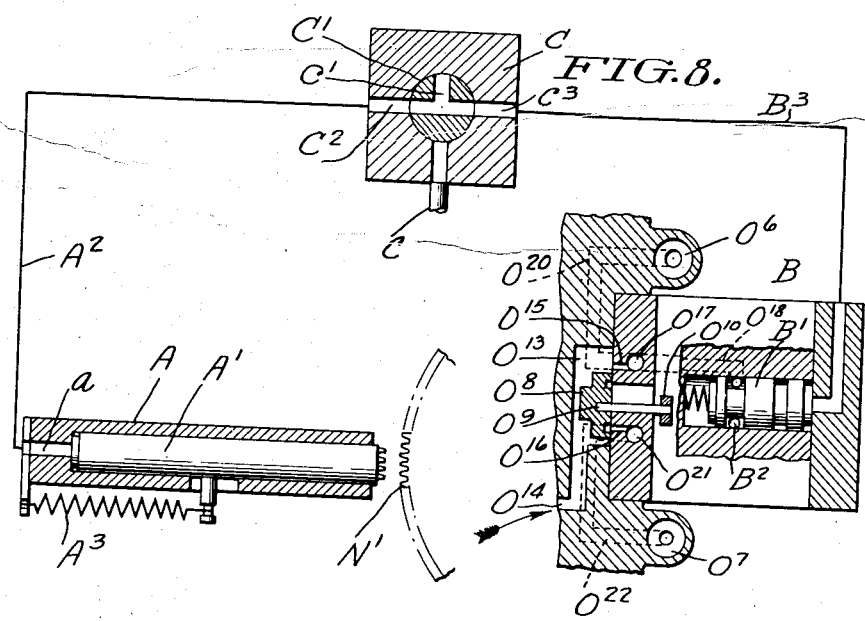
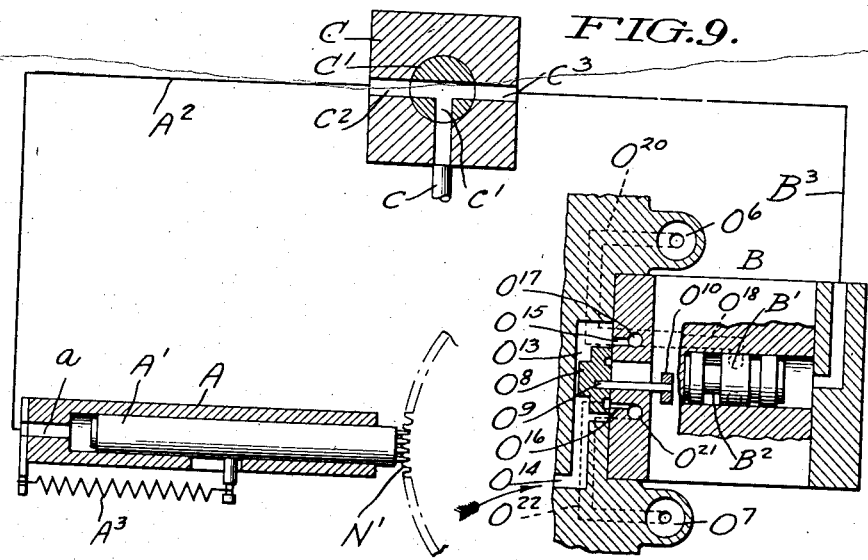
INVENTOR:
Maurice Richard Dewhurst,
BY
John A. Ferguson
HIS ATTORNEY.

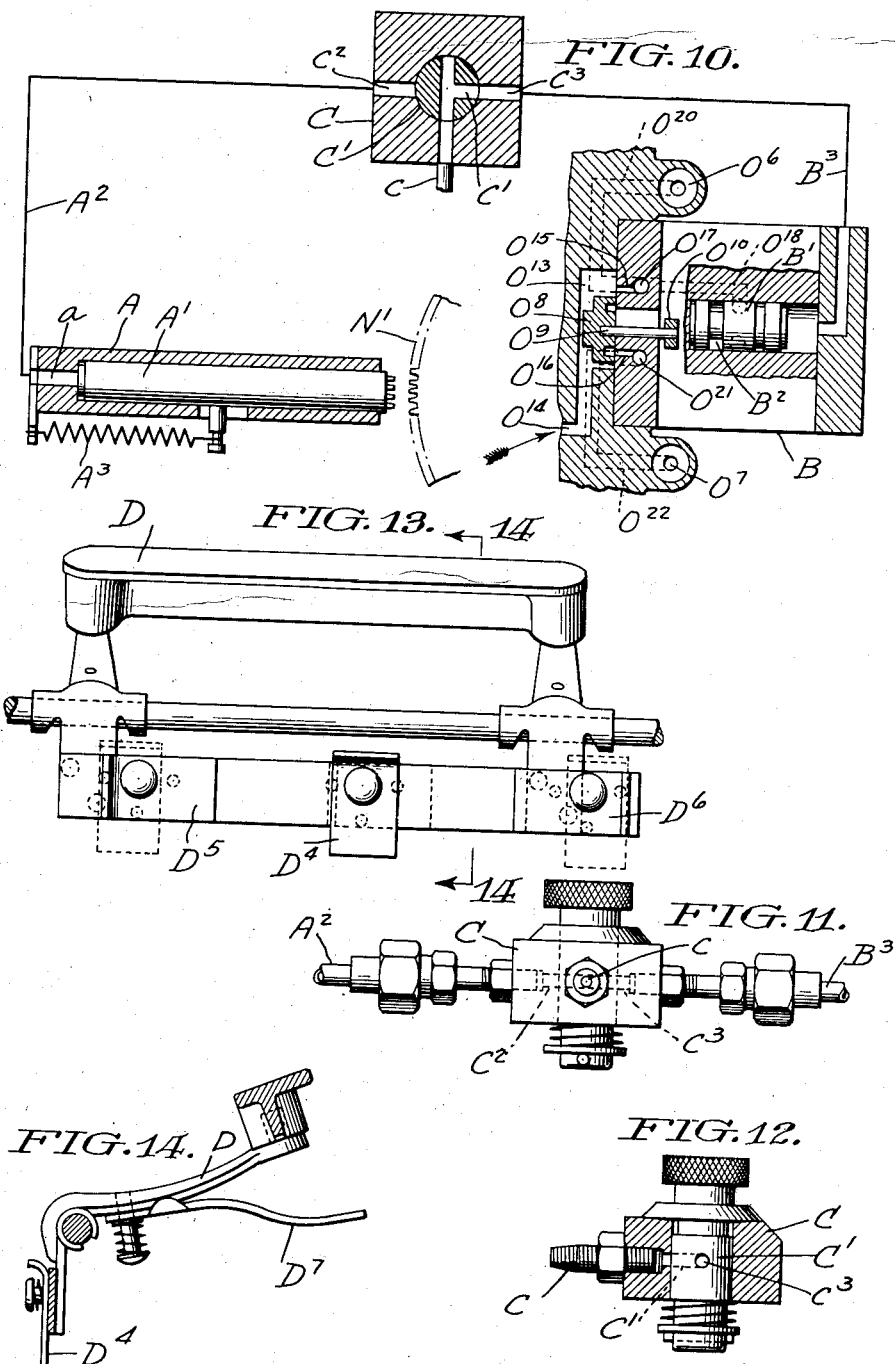

Patented May 23, 1939

2,159,473

UNITED STATES PATENT OFFICE 2,159,473

PRODUCTION OF MACHINE-SET TYPE COMPOSITION

Maurice Richard Dewhurst, Earlswood, England, assignor to Lanston Monotype Machine Company, Philadelphia, Pa., a corporation of Virginia Application March 19, 1938, Serial No. 196,848
In Great Britain November 1, 1937

7 Claims. (Cl. 164—112)

This invention relates to the production of machine-set type-composition on record-strip controlled type-casting and composing machines, which produce justified lines of single types.

With such systems and machines, a record-strip is first prepared in a composing machine wherein punches are actuated from a keyboard to produce in a paper or other record-strip or controller, perforations, which control in such single-type casting and composing machines, certain operations, such as the positioning of a die case or matrix carrier, the dimensioning of a mold for characters and spaces, the setting of justification mechanism for each line, a metal injecting pump and other mechanisms or devices.

According to the method generally employed in such machines, the keys of the record-strip composing machine are so connected with the perforators or punches, that certain signals represent characters, numerals, or like symbols of definite dimensions, others represent blanks or spaces of fixed dimensions, and still others blanks or spaces of varying or variable dimensions. The bodies produced in the casting machine under the instrumentality of the perforations in the record-strip which represent character types, or blank types or spaces, of fixed dimensions, are generally referred to as "type bodies" and the bodies produced by perforations representing blank bodies of variable dimensions, are known as "justification spaces" or interword spaces.

Each complete signal in the record-strip denotes, or produces a separate cast in the mold of the casting machine. The "type bodies" are each cast in definite dimensions according to their fixed unit-value or width. The "justification spaces" are cast as separate bodies of a predetermined basic or minimum width varied by a fraction of the total justification line remainder to justify a composed line.

Theoretically the width of a "justification space" which is the space between words in a composed line, may be of any desired dimension, but in practice it is subject to certain limitations.

In the normal key-controlled record-strip composing machine, in which the invention is to be embodied and a full description of which is to be found, for example, in United States Letters Patent No. 944,405 dated December 28, 1909, the operation of any key, not only produces the necessary signal for a "type body", or a "justification space" body, but also effects the recording of the unit value of the signal, and the step by step advance of the record-strip through the machine.

The unit value of a signal for a "type body" or the like, or the minimum value of a "justification" or interword space body is measured and recorded through a units wheel which is partly rotated by the movement of a line-measuring rack with which it is geared, and in turn is geared with a units measuring rack the extent of movement of which is determined by one or other of a series of units stops operated from key-controlled punch bars of each signal.

In the casting and composing machine, with which a record-strip so composed is employed, an example of which is described in United States Letters Patent No. 625,998 dated May 30, 1899, the mold is furnished with a mold-dimensioning blade or member, which is positioned against a variable stop or gauge for each type-body cast. The gauge or stop for this mold-dimensioning blade both for "type bodies" and "justification spaces" is controlled by perforations or signals in the record-strip.

For casting "type-bodies" in the normal manner the mold-blade stop or gauge comprises a normal wedge, a "type" transfer wedge and a stationary abutment.

For casting variable space-bodies or "justification type-bodies" which are employed as interword spaces, in the normal manner, the stop for the mold blade comprises the normal wedge, two justification wedges, a "justification" transfer wedge and a stationary abutment.

The two justification wedges are positioned prior to the casting of any body in a particular line of composition and are brought into or put out of operation by the movements of the "justification transfer" wedge and the type-transfer wedge. The change or transfer of the mold-dimensioning mechanism from "type-bodies" to "justification bodies" is controlled by a perforation in the record-strip produced by a space or S-punch which is operated by a special or space-key in the record-strip preparing machine.

In the specification of application for United States Letters Patent, Serial No. 155,202, filed July 23, 1937, there is disclosed a new method of typographic composition or production whereby improvements and economies are effected. According to the method therein disclosed, separate or independent interword spaces are abolished and in their place there are used as interword spaces, equal fractions or increments of the justification space in a composed line and one of such fractions or increments is cast on and as part of the "type body" forming the initial character of each word in a particular line.

It is the chief object of the present invention to improve or extend the scope of, the method disclosed in the aforesaid specification, by increasing the capacity of the record-strip composing machine and providing improved mechanism therein for controlling and operating the necessary elements or devices required.

Record-strip composing machines equipped to carry out the method of composition disclosed in the said specification, Serial No. 155,202, are highly satisfactory, but are limited or restricted in capacity or scope. This method is applicable to normal setting and what may be termed close-setting, the latter being generally employed with types of the smaller point sizes used in commercial printing. With larger point sizes of type the amount of line remainder to be absorbed by justification is often too small to be distributed and serve as adequate interword spaces attached to the initial letters of each word in a composed line.

It is proposed by the present invention to provide mechanism or devices whereby the initial character of each word in a line will be cast with an additional definite or constant minimum amount, for example, four units, and also a variable amount representing an increment of the total justification space of that line. Thus by a combined signal in the record-strip there is produced in the casting machine, as a single cast, a type body comprising the type character body, plus the definite increment, plus the variable justification increment, and these two added increments serve as an interword space. Since there is no interword space at the beginning of a line, the expression "the initial character of each word in a line" applies only to such initial characters as are preceded by a space and necessarily does not apply to the first word or syllable in a line.

It is also proposed by the present invention to provide improved mechanism whereby the interword spaces, each consisting of an increment of the total justification space in a line are each cast on one side of each initial character type body.

As in the case of the invention above referred to, there is effected with both of the arrangements above referred to, a considerable saving in the amount of record-strip required for a given piece of composition, and a considerable saving in the number of cycles of operation in the casting machine and a consequent increase in output per hour. Also as in the previous invention, separate interword or justification spaces are done away and the liability for these to rise up and cause a printed mark is avoided since they are cast as part of a character type body.

In accordance with the present invention, there are provided an arresting or locking device for the units wheel of the line and units-measuring mechanism, an arresting device for the record-strip feeding mechanism and the supply of air to motors for operating these two devices is controlled from the normal space key of the machine, or from a special key, which actuates the normal S-punch or justification space punch of the machine.

A hand-operated setting valve is conveniently arranged in an air supply conduit leading from a cylinder, the air supply to which is controlled by the space-punch key, and the air motors of the two locking or arresting devices, so that air may be supplied to one or both of these motors, or cut off from both.

Referring to the accompanying drawings:

Fig. 1 is a diagrammatic view of the mechanism of the present invention and the co-operating parts of the existing record-strip composing machine.

Fig. 1a is a fragmentary view showing in perspective several punch bars, one of which is a dummy punch bar, being unprovided with a punch.

Fig. 2 is an end elevation of the record-strip feeding mechanism of the machine with the present invention applied thereto.

Fig. 3 is an end view of the valve mechanism for controlling the record-strip feed motors to arrest the feed mechanism.

Fig. 4 is a sectional elevation of the mechanism shown in Fig. 3.

Fig. 5 is a sectional plan of the mechanism shown in Fig. 4.

Fig. 6 is another sectional elevation of the mechanism shown in Fig. 3 with the control valve in another position.

Fig. 7 is another sectional plan of the mechanism shown in Figs. 4 and 6.

Fig. 8 is a sectional elevation, partly diagrammatic, showing the valve mechanism for arresting the units measuring mechanism.

Fig. 9 is a similar view showing the mechanism in a different position.

Fig. 10 is also a similar view showing the mechanism in still another position.

Figs. 11 and 12 are respectively an elevation and a sectional elevation of the setting valve.

Fig. 13 is an elevation of the space or justification or special key and

Fig. 14 is a sectional elevation of the key shown in Fig. 13.

The present invention will be described and is shown in the drawings forming part of this specification as embodied in a record-strip composing machine, such as described in United States Letters Patent No. 944,405, previously referred to. Such machines, as already stated, are employed for producing perforated record-strips for controlling single type-casting and composing machines such as described in United States Letters Patent No. 625,998, also previously referred to.

The mechanism of the present invention comprises a stop device A for arresting or locking the units measuring devices; a valve mechanism B for arresting or locking the record-strip feeding mechanism and a setting valve C the supply of air to which is controlled by or from a special key or from the justification space or S-punch key D of the machine.

In such record-strip composing machines, there is a series of keys for operating, through a permutation system, punches to produce signals designating characters and the like and there is a special or space key for producing signals designating interword or justification spaces. This key operates a punch known as the S-punch, the perforation made by which controls in the casting machine the operation of the "justification transfer" wedge already referred to.

In the drawings D is the "justification space" key and E indicates one of a series of "character" keys.

These keys, D and E, act on longitudinally movable key-bars F which, in accordance with a permutation system, are furnished with lugs F¹ to engage transverse rocking bars G, which in rocking engage lugs H¹ of a series of longitudinally movable valve bars H. The bars H act upon valves I to admit air to the cylinder of punch pistons J. These pistons in turn act upon pivoted arms K in which the lower ends of the punch bar $D^1$ or $E^1$ are situated as the case may be. The punches attached to these punch bars are raised through a guide L over which the record-strip to be composed by punching is passed.

In general, each "character" "type-body" and each "justification" space or "interword space" body is represented or designated in the record-strip by two aligned perforations. One component of such signals determines a matrix position, and the other in addition to determining a matrix position, also controls in the casting machine a dimensioning of the mold for the designated matrix. The operation of a key controls the record-strip feeding mechanism and also the units measuring and recording mechanism. Each punch bar $E^1$ and the punch bar $D^1$ is furnished with a shoulder $D^2$ or $E^2$ which, when a punch bar is raised, lifts a rocking bar M which is connected by arms $M^1$ to a shaft $M^2$. The shaft $M^2$ in turning operates through a link $M^3$ a pivoted lever $M^4$ which in turn operates a pivoted lever $M^5$. The lever $M^5$ is connected by a link $M^6$ to a pivotally supported carrier $M^7$ of a units-measuring rack N. Thus, when the shaft $M^2$ is turned by a rising punch bar, the carrier $M^7$ is raised to bring the units rack N into engagement with the units wheel $N^1$. This wheel $N^1$ carries on its shaft a toothed wheel $N^2$ which gears constantly with a motor-driven line-measuring rack $N^3$, which is mounted to slide in a support $N^4$. The wheel $N^1$ is normally held stationary by a holding pawl (not shown) but when a key is operated and the rack N is brought into gear with the wheel $N^1$, the lever $M^5$ releases the holding pawl, the rack $N^3$ is advanced and likewise the rack N until the movement of the latter is arrested by the engagement of a stop $N^5$ thereon with one of a series of pivoted units stops $N^6$. The punch bars $E^1$, one of which is a component of each character signal, are furnished with a recess in which bears one end of a pivoted arm $N^7$ connected by a link $N^8$ with the rear end of the units stop $N^6$.

Thus far, the description relates to the normal machine, and the parts above referred to are employed in cooperation with the mechanism of the present invention.

The stop device A which, in accordance with the present invention, is operated to arrest temporarily the feed of the units measuring mechanism, when one kind of special composition is being produced, is mounted alongside the units wheel $N^1$. This device (see Figs. 1, 8, 9 and 10) comprises a piston $A^1$ mounted in the body A to the rear end of which a supply of air is admitted when required through an inlet $a$, by the operation of the S-punch key D. In the present embodiment a pipe $A^2$ leads into the inlet $a$ through the hand operated valve to the setting valve C. At its outer end this piston $A^1$ is furnished with teeth adapted, when the piston is advanced under air pressure, to engage the teeth of the units wheel and prevent it from being rotated by its normal driving power or mechanism.

When air pressure is withdrawn the piston $A^1$ is returned by a spring $A^3$.

In the normal working of the composing machine this piston $A^1$ is inoperative.

The valve mechanism B for arresting the record-strip feed mechanism when certain kinds of composition are to be produced, is inserted in the air conduit of a motor for operating the feed mechanism O, (Fig. 2). This feed mechanism, as hitherto, comprises a driving pawl $O^1$ and a holding pawl $O^2$ which engage alternately a ratchet wheel $O^3$ to control the feeding of the record-strip. These pawls are actuated by a rod $O^4$ the lower end of which is attached to an intermediate point of a pivoted lever $O^5$. One end of this lever $O^5$ is attached to the piston of a driving motor $O^6$ and the other to a piston of a return motor $O^7$.

The admission of air to the cylinders of these motors is controlled by a slide valve $O^8$, (Figs. 4, 5, 8, 9 and 10), to which is attached a rod $O^9$ connected at its outer end to pivoted link $O^{10}$ to which in turn is attached a link $O^{11}$, (Fig. 2), the free end of which is mounted in a curved or cam slot in an arm $O^{12}$ carried on the rock shaft $M^2$ which is rocked from the punch bars. In the normal working of the machine the valve $O^8$ admits air alternately to the cylinders of the motors $O^6$ and $O^7$.

According to the present invention the valve mechanism B as stated is arranged in the air supply conduit to the motor $O^6$. The air conduit beyond the valve $O^8$ is led by a conduit into the cylinder in which the valve $B^1$ is situated. In the normal working of the machine the piston valve $B^1$ is inoperative. When the piston valve $B^1$ is operated it shuts off the supply of air to the motor $O^6$.

Air to operate the valve B and the stop A is supplied from the cylinder $D^3$ of the S-punch bar motor, and according to the present embodiment of the invention, such air passes through the hand-operated setting valve C. Each time air is admitted to the cylinder $D^3$ by the operation of the special or justification key D a portion of this air is led by a pipe or conduit $c$ to the valve box C. In this box there is arranged a rotatable valve $C^1$, furnished with three passage ways $c^1$, $c^2$ and $c^3$.

The justification space or special key D is as hitherto furnished with three adjustable lugs $D^4$ $D^5$ $D^6$ any of which can be moved into a position to engage lugs on the longitudinally movable bars F.

When the machine is to be operated for normal composition, that is to say, when the "justification" or variable interword spaces are to be cast as separate type bodies, then the machine will be operated as hitherto. One or other of the lugs $D^5$ $D^6$ on the key D will be turned down into operative position so that this key will operate the S-punch and one of the Series $E^1$. The setting valve C will be placed in the position indicated in Fig. 8 so that no air from the cylinder of the S-punch motor will pass through this valve to operate the locking or arresting devices A and B.

When it is desired to produce composition in which no interword spaces, as separate type bodies, are employed, and wherein interword spaces are represented by equal increments of the total space required to justify a line, one of such increments being cast on one side of the body of each initial character in the line then the mechanism is set as follows: The lugs $D^5$ and $D^6$ on the space key D are turned from operative position and the lug $D^4$ is turned down (see Figs. 1, 13 and 14) into operative position the modified setting of these lugs $D^4$, $D^5$ and $D^6$ being shown in dotted lines in Fig. 14 and the setting valve C is turned so that air entering the valve by the inlet $c$ travels through the passage $c^1$ therein to the passages $c^2$ and $c^3$ and enters the pipes $A^2$ and $B^3$ leading to the cylinders A and B.

When the mechanisms are thus set, the operator proceeds as in ordinary composition, but when he actuates the space key D for an interword space, in place of a separate signal being recorded or punched, the units value thereof registered and the record-strip fed one step forward, the S-punch motor alone will be operated to record the "justification" transfer signal and air will pass from the cylinder of the S-punch motor into and through the valve C. A portion of the air from the valve C will pass through the pipe $A^2$ and will project the stop $A^1$ and thereby arrest the units wheel. At the same time another portion of this air will pass through the valve C to the pipe $B^3$ and move the piston $B^1$ so as to cut off air to the driving motor $O^6$ of the record-strip feeding mechanism O. Thus no units value will be recorded for this signal and the record-strip being stationary the next signal recorded, which will be that of the initial character of a word, will be placed alongside the perforation produced by the S-punch.

The effect of this combined signal when presented by the record-strip in the casting machine controlled thereby, will be that the die case will be positioned over the mold by the character components of the signal and the mold-dimensioned for that character, but the component recorded by the S-punch will transfer the casting from the normal mold-dimensioning wedge alone to the mold-dimensioning wedge plus the justification wedges through the "justification" transfer wedge.

With this method of operation there is a very considerable saving in the amount of record-strip employed for a given piece of composition. In the casting machine there is a considerable saving in the cycles or revolutions of the caster, as compared with composition in which each interword space is a separate body produced by a separate cycle of the machine. Thus an increased output is achieved and the space occupied by a piece of composition is reduced as the space between words is smaller than can be produced when separate justification spaces are employed.

When the key D operates the S-punch alone the sense of touch to the operator is different from that when the key is normally coupled to two punch bars, and this difference tends to hinder the finger actions. To overcome this the key D has connected to its two springs $D^7$ which bear on the frame of the keyboard to preserve the usual sense of touch.

With the larger sizes of type used for composition it sometimes happens that the total amount of justification, divided up into increments, one of which is cast on the body of the initial letter of each word, does not provide large enough interword spaces to be in harmony with the setting.

In order to provide this extra word space, while preserving or maintaining advantages of the method embodied in the invention, namely, the saving of record-strip, and revolutions of the casting machine, the mechanism of the present invention may operate in another way. According to this arrangement there are produced by or through the mechanism of the invention, signals in the record-strip whereby the type body bearing the initial letter of each character of each word will be cast of the normal body width of the character with a definite additional width, of say four units, and one increment of the total justification space. These three integers will be cast as a single body in a single cycle of the casting machine.

For this method of composition either the lug $D^5$ or $D^6$ on the key D is turned into operative position and the lug $D^4$ rendered inoperative. The valve C is set (see Fig. 10) to cut off air from the stop A for the units wheel and to supply air only to the record-strip feed lock B.

Thus when the key D is operated to perforate an interword space, the record-strip feed will be arrested by the operation of the piston $B^1$, but the units wheel will travel until the units rack comes into contact with a projected units stop, which is operated from a punch bar now coupled with the key D, but which carries no punch. Thus four units will be registered, but although the justification signal is made in the record-strip no registration of any units value will take place for this additional increment which is to be added to the cast type body.

The cylinder B for the piston $B^1$ is inserted in an air supply conduit $O^{14}$, the direction of movement of the air being shown by arrows in Figs. 8, 9 and 10 and the reciprocating or sliding valve $O^8$ admits air alternately through the passage $O^{15}$ of the paper feed motor and passage $O^{16}$ for the return motor thereof.

In accordance with the present invention in place of passing direct to the feed motor $O^6$ the air, when the valve $O^8$ uncovers the passage $O^{15}$ (see Figs. 3, 4 and 5) will pass through an opening $O^{15}$ down a passage $O^{17}$ and along a passage $O^{18}$ then around the reduced portion $B^2$ of the piston $B^1$ to passage $O^{19}$ thence by a passage $O^{20}$ to beneath the piston $O^6$ to operate the feed mechanism. When, however, the piston valve $B^1$ is operated by the entrance of air from the motor controlled by the key D of the S-punch, the piston will be moved forward (see Fig. 7) and the reduced portion $B^2$ of the piston $B^1$ will be moved out of alignment with the air passage, which will be blocked by the body of the piston $B^1$, so that no air can enter the cylinder of the driving motor $O^6$ for the record-strip feed mechanism.

The passage for the air to the return motor $O^7$ of the record-strip feed mechanism is not influenced by the valve B but some alteration in the position of the conduits is necessitated by the present mechanism. When the valve $O^8$ is moved to the left from the position shown in Figs. 5 and 7 the air from the chamber $O^{13}$ enters the passage $O^{16}$ (see Fig. 6) and passes down a conduit $O^{21}$ and along a passage $O^{22}$ to beneath the piston $O^7$ of the return motor and thus returns the paper feed mechanism to normal.

With this setting of the mechanism therefore when the space key D is operated the minimum units value of the justification space is recorded, the signal for the transfer given, and the paper feed only is arrested so that the next signal, which will be the initial character in a word, will be placed alongside this justification space signal and this combined signal when presented in the casting machine will produce a cast consisting of a type body of the correct width for the character plus a definite amount representing the minimum justification space and also plus an increment of the total justification space of the line. The product will have the appearance of normal type setting but the interword spaces, or justification spaces, will be cast as part of the initial character of each word.

Although no saving of space, occupied by a particular piece of composition, is effected with this method, there is still a considerable saving in the amount of record-strip required for a given piece of composition, and also a very considerable saving in the revolutions of the casting machine to produce such a piece of composition.

I claim:

1. In a typographic record-strip preparing machine furnished with a series of key-controlled punches, a record-strip feeding mechanism, and a units-measuring mechanism the combination with the said record-strip feeding mechanism and the units measuring mechanism, of a separate air-controlled locking or arresting device for each, and a key which controls a space or transfer punch (S-punch) and the supply of air to the said locking or arresting devices separately or simultaneously.

2. In a typographic record-strip preparing machine of the kind described, the combination with separate air-actuated locking or arresting devices for the record-strip feeding mechanism and the units measuring mechanism of the machine and a key for operating a space or transfer (S-punch) and for controlling the supply of air to the said locking or arresting devices, of a hand-controlled setting valve arranged in the air supply between the said key and the motors of the two locking or arresting devices.

3. In a typographic record-strip preparing machine of the kind described, the combination with a driving motor for the record-strip feeding mechanism, of an air operated valve controlled by the operation of a space or transfer punch key for rendering the said driving motor inoperative.

4. In a typographic record-strip preparing machine of the kind described, the combination with a driving wheel for a units-measuring mechanism, of an air-operated locking device for the units wheel controlled from a space or S-punch key.

5. In a typographic record-strip preparing machine of the kind described, the combination with a ratchet wheel forming part of a units measuring mechanism and a record-strip feeding mechanism operated by an air motor of a locking or arresting device for the ratchet wheel comprising an air piston furnished on its outer end with teeth adapted to engage the units wheel, an arresting device for the record-strip motor comprising an air piston valve in the air supply conduit of the motor for the feeding mechanism and a special or S-punch key which also controls a supply of air, through a hand-controlled setting valve, to the arresting piston for the units wheel and the piston in the supply conduit of the record strip feeding mechanism.

6. In a typographic record-strip preparing machine of the kind described, the combination with a ratchet wheel of a units measuring mechanism of an air operated piston having teeth adapted to engage the ratchet wheel and an air connection between the cylinder of said piston and an air cylinder controlled by the operation of a space or S-punch key.

7. In a typographic record-strip preparing machine of the kind described, the combination with the driving motor of the record-strip feeding mechanism, of an air operated piston in the air supply to the said motor and an air connection between the cylinder of the said piston and a cylinder controlled by the operation of a space or S-punch actuating key.

MAURICE RICHARD DEWHURST.